(12) United States Patent
Sehara et al.

(10) Patent No.: US 7,876,649 B2
(45) Date of Patent: Jan. 25, 2011

(54) OPTICAL DISC RECORDING AND REPRODUCING APPARATUS

(75) Inventors: Shunsuke Sehara, Osaka (JP); Yasunori Kuwayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 284 days.

(21) Appl. No.: 12/289,088

(22) Filed: Oct. 20, 2008

(65) Prior Publication Data

US 2009/0109818 A1    Apr. 30, 2009

(30) Foreign Application Priority Data

Oct. 29, 2007    (JP) ............................. 2007-279903

(51) Int. Cl.
*G11B 7/00* (2006.01)

(52) U.S. Cl. .............. 369/44.29; 369/44.32; 369/44.35; 369/44.41

(58) Field of Classification Search .............. 369/44.35, 369/44.29, 44.32, 44.41
See application file for complete search history.

(56) References Cited

U.S. PATENT DOCUMENTS

| | | | |
|---|---|---|---|
| 6,744,705 B1 * | 6/2004 | Sumida et al. ........... | 369/44.11 |
| 7,551,529 B2 * | 6/2009 | Mitsuda .................... | 369/44.35 |
| 2004/0179450 A1 * | 9/2004 | Mori et al. ............... | 369/53.37 |
| 2005/0180279 A1 | 8/2005 | Sogawa et al. | |
| 2007/0133366 A1 * | 6/2007 | Sawada .................... | 369/44.35 |
| 2007/0297306 A1 * | 12/2007 | Kim ........................ | 369/53.24 |

FOREIGN PATENT DOCUMENTS

JP    2005-228366    8/2005

* cited by examiner

*Primary Examiner*—Wayne R Young
*Assistant Examiner*—Latanya Bibbins
(74) *Attorney, Agent, or Firm*—Morgan Lewis & Bockius LLP

(57) ABSTRACT

A DSP of the DVD recorder includes a balance value setting portion for determining an appropriate value of a focus balance value α when information is reproduced from an optical disc so as to record the determined focus balance value α0 in a balance value storing portion and to set the same in a first amplifier of a focus error signal generating circuit, and a correction executing portion for reading the focus balance value α0 stored in the balance value storing portion when information is recorded in the optical disc 2 so as to correct the read value to be a focus balance value α1, which is set in the first amplifier of the focus error signal generating circuit.

5 Claims, 9 Drawing Sheets

OPTICAL DISC RECORDING AND REPRODUCING APPARATUS

This application is based on Japanese Patent Application No. 2007-279903 filed on Oct. 29, 2007, and the contents of which are hereby incorporated by reference.

BACKGROUND OF THE INVENTION

1. Field of the Invention

The present invention relates to an optical disc recording and reproducing apparatus equipped with an optical pickup for projecting a laser beam from a laser light source to an optical disc and converting reflection light from the optical disc into a plurality of electric signals via a split optical sensor, through which the apparatus records information on the optical disc and reads information stored in the optical disc so as to reproduce the information. In particular, the present invention relates to an optical disc recording and reproducing apparatus for recording and reproducing information on a digital versatile disk (DVD) having a 0-th layer and a first layer that can record information.

2. Description of Related Art

Conventionally, as for the optical disc recording and reproducing apparatus equipped with an optical pickup for projecting a laser beam from a laser light source to an optical disc and converting reflection light from the optical disc into a plurality of electric signals via a split optical sensor, through which the apparatus records information on the optical disc and reads information stored in the optical disc so as to reproduce the information, a tracking servo method is adopted as a control method for the laser beam emitted from the optical pickup to follow correctly a track formed on the optical disc. A differential push pull (DPP) method is known as this tracking servo method. This DPP method generates a tracking error signal by a computation on output signals of light receiving elements obtained from one main beam and two sub beams.

In order to improve accuracy of the tracking servo using the DPP method, various apparatuses and methods are proposed. For instance, JP-A-2005-228366 discloses an optical disc recording and reproducing apparatus in which a gain value tolerance setting means measures a gain value corresponding to a ratio of levels of a main push pull (MPP) signal and a sub push pull (SPP) signal generated by a tracking error signal computation circuit so as to set a tolerance of the gain value, and an eccentric quantity measuring means measures eccentric quantity of an optical disc so that a gain value of an amplifier is set based on the eccentric quantity.

However, although the above-mentioned optical disc recording and reproducing apparatus can improve accuracy of the tracking servo, intensity of the laser beam to be projected onto the optical disc is different between the reproducing operation and the recording operation. Therefore, if the recording operation is performed at a position of the optical pickup with respect to the optical disc in the direction closing or separating from the position set in the reproducing operation, the accuracy of the tracking servo may be deteriorated.

In particular, if a DVD having a 0-th layer and a first layer for recording is used for recording information, amplitude of the tracking error signal may be decreased due to an influence of interference light from the neighboring layer or the like (see FIG. 8), resulting in unstable tracking servo.

SUMMARY OF THE INVENTION

It is an object of the present invention to provide an optical disc recording and reproducing apparatus that enables to stabilize accuracy of tracking servo.

An optical disc recording and reproducing apparatus according to the present invention is equipped with an optical pickup for projecting a laser beam from a laser light source to an optical disc and converting reflection light from the optical disc into a plurality of electric signals via a split optical sensor, through which the apparatus records information on the optical disc and reads information stored in the optical disc so as to reproduce the information. The apparatus includes a balance value storing portion for storing in advance a focus balance value indicating a balance an S-shaped curve obtained in a focus search operation, a first signal generating portion for generating a focus error signal indicating quantity of focal position shift of projection light from the laser light source with respect to a position of a recording surface of the optical disc via a computing equation defined by the focus balance value stored in the balance value storing portion based on the plurality of electric signals, a position control portion for control a position of the optical pickup in the direction closing to or separating from the optical disc based on the focus error signal, a second signal generating portion for generating a tracking error signal indicating quantity of focal position shift of the projection light from the laser light source with respect to the track position on the optical disc based on the plurality of electric signals after the position control portion has controlled the position of the optical pickup, a balance value setting portion for determining an appropriate value of the focus balance value when information is reproduced from the optical disc so as to record the determined appropriate value of the focus balance value in the balance value storing portion and to set the same in the first signal generating portion, and a correction executing portion for reading the appropriate value of the focus balance value stored in the balance value storing portion when information is recorded on the optical disc so as to correct the read value and to set the corrected value in the first signal generating portion.

According to this structure, when information is reproduced from the optical disc, an appropriate value of the focus balance value is determined. The determined focus balance value is recorded in the balance value storing portion and is set in the first signal generating portion. When information is recorded on the optical disc, the focus balance value stored in the balance value storing portion is read, corrected and set in the first signal generating portion. Therefore, a decrease in amplitude of the tracking error signal in the recording process can be prevented by correcting the focus balance value to be an appropriate value. Thus, accuracy of the tracking servo can be stabilized. More specifically, when information is recorded on the optical disc, the focus balance value is corrected to a value such that the amplitude of the tracking error signal becomes maximum (see FIG. 8) so that a decrease in amplitude of the tracking error signal in the recording process can be prevented.

In addition, as to the optical disc recording and reproducing apparatus according to the present invention, the correction executing portion corrects the focus balance value by multiplying a preset predetermined correction value to the appropriate value of the focus balance value stored in the balance value storing portion, and sets the corrected value in the first signal generating portion.

According to this structure, the focus balance value is corrected by multiplying a preset predetermined correction value to the appropriate value of the focus balance value stored in the balance value storing portion and is set in the first signal generating portion. Thus, accuracy of the tracking servo can be stabilized by a simple structure.

Furthermore, as to the optical disc recording and reproducing apparatus according to the present invention, the predetermined correction value is a value within the range of 1.12 to 1.17.

Since the correction value is a value within the range of 1.12 to 1.17 in this way, accuracy of the tracking servo can be stabilized by a simple structure.

In addition, the optical disc is a DVD capable of recording information in two layers including the 0-th layer and the first layer.

According to this structure, since the optical disc is a DVD capable of recording information in two layers including the 0-th layer and the first layer, amplitude of the tracking error signal will be decreased in the recording operation due to an influence of the interference light from the neighboring layer or other factor. Therefore, the focus balance value is corrected so that the effect of stabilizing the accuracy of the tracking servo becomes more apparent.

Furthermore, as to the optical disc recording and reproducing apparatus according to the present invention, the correction executing portion reads and corrects the appropriate value of the focus balance value stored in the balance value storing portion only in the case where information is recorded in the 0-th layer of the optical disc.

More specifically, when information is recorded in the 0-th layer of the optical disc capable of recording information in two layers including the 0-th layer and the first layer, amplitude of the tracking error signal will be decreased due to an influence of the interference light from the neighboring layer or other factor. Therefore, only in this case the focus balance value is corrected so that accuracy of the tracking servo can be further stabilized.

DETAILED DESCRIPTION OF THE PREFERRED EMBODIMENTS

Figure 1:
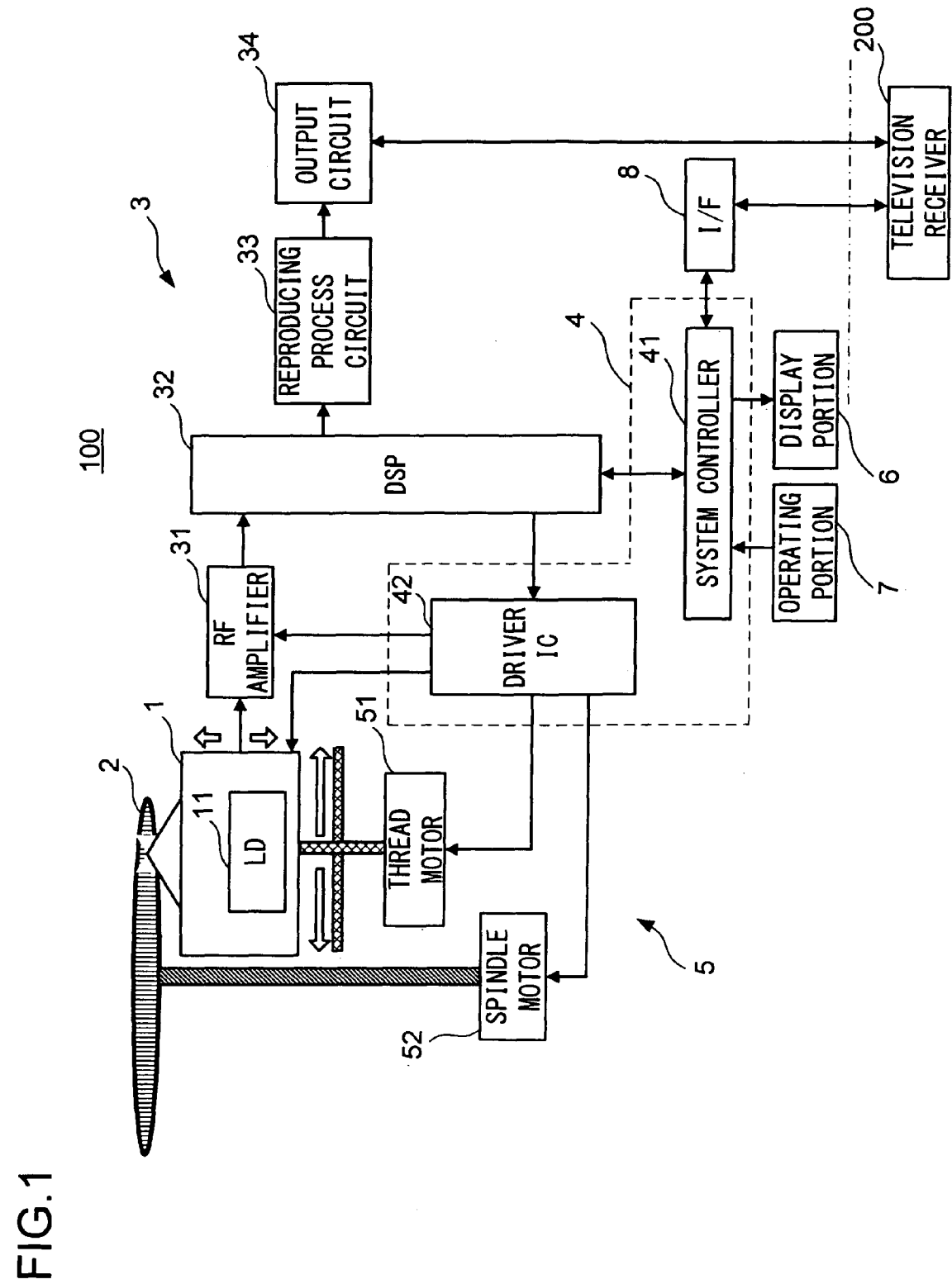
FIG. 1 is a structural diagram showing an example of a DVD recorder according to the present invention.

Hereinafter, embodiments of the present invention will be described with reference to the attached drawings. FIG. 1 is a structural diagram showing an example of a DVD recorder according to the present invention. A DVD recorder 100 (corresponding to the optical disc recording and reproducing apparatus) includes an optical pickup 1, an output device 3, a control device 4, a driving device 5, a display portion 6 and an operating portion 7.

In addition, the DVD recorder 100 is capable of communicating with a television receiver 200. The television receiver 200 is equipped with a speaker and a monitor.(not shown) so as to deliver information from the DVD recorder 100 such as audio information, video information and the like via the speaker and the monitor, and it receives television broadcastings so that the received information such as the audio information, the video information and the like are delivered to the DVD recorder 100 via an interface portion 8.

The optical pickup 1 is provided with a laser diode (LD) 11 and projects a laser beam from the LD 11 to an optical disc 2 so as to record various information such as the audio information and the video information on the optical disc 2 and to read various information such as the audio information and the video information stored in the optical disc 2. In addition, the optical pickup 1 converts reflection light from the optical disc 2 to be a target of the reproduction into a plurality of electric signals so as to generate a focus error signal FE via a split optical sensor 16 (see FIG. 2) and a focus error signal generating circuit 18 (see FIG. 5B), so as to perform a focusing process (a process for matching a focal position of projection light from the LD 11 with a position on the recording surface on the optical disc 2.

Furthermore, the optical pickup 1 converts the reflection light from the optical disc 2 to be a target of the reproduction into a plurality of electric signals so as to generate a tracking error signal TE via the split optical sensor 16 (see FIG. 2) and a tracking error signal generating circuit 17 (see FIG. 5A), so as to perform a control by tracking servo (a control for correctly following a track formed on the optical disc 2).

The LD 11 (corresponding to the laser light source) projects a laser beam onto an optical disc 2a for recording various information such as the audio information and the video information on the optical disc 2 and for reading information stored in the optical disc 2. In addition, the optical pickup 1 is adapted to be able to move in the radial direction of the optical disc 2 and the vertical direction (closing or separating direction) with reference to the same driven by a thread motor 51.

The optical disc 2 is a so-called dual layer (DL) type digital versatile disk (DVD) that is capable of recording in two layers including the 0-th layer and the first layer.

The output device 3 converts the information such as the audio information and the video information from the optical pickup 1 into sounds and images, which are delivered respectively to a speaker and a monitor (not shown) disposed provided to the television receiver 200. The output device 3 includes a radio frequency (RF) amplifier 31, a digital signal processor (DSP) 32, a reproducing process circuit 33, and an output circuit 34. The RF amplifier 31 amplifies signals corresponding to the audio information, the video information and the like from the optical pickup 1.

The DSP 32 and the reproducing process circuit 33 perform various information processings for reproduction (e.g., image processing or the like) on the signal from the RF amplifier 31. In addition, the DSP 32 records information such as the video information and the audio information received from the television receiver 200 via a system controller 41 on the optical disc 2 via a driver IC 42, the optical pickup 1 and the like. The output circuit 34 performs a DA conversion process and the like for delivering the information from the reproducing process circuit 33 to the speaker and the monitor (not shown) provided to the television receiver 200.

The control device 4 controls operations of the optical pickup 1 and the driving device 5 based on an instruction operation received via the operating portion 7, and it includes a system controller 41 and the driver IC 42. The system controller 41 receives information from the operating portion 7 and transmits the same to the DSP 32, and it also transmits information from the DSP 32 to the display portion 6. In addition, the system controller 41 receives the video information, the audio information and the like from the television receiver 200 via the interface portion 8 and delivers the same to the DSP 32.

The driver IC 42 controls operations of the optical pickup 1 and the driving device 5 based on an instruction from the DSP 32. More specifically, the driver IC 42 controls current to be supplied to the LD 11 disposed in the optical pickup 1 and controls operations of the thread motor 51 and a spindle motor 52 constituting the driving device 5.

The driving device 5 includes the thread motor 51 and the spindle motor 52. The thread motor 51 (corresponding to a part of the position control portion) moves the optical pickup 1 in the radial direction and the vertical direction of the optical disc 2 based on an instruction from the driver IC 42. The spindle motor 52 drives the optical disc 2 to rotate based on an instruction from the driver IC 42.

The display portion 6 includes a liquid crystal display (LCD) or the like and displays information from the DSP 32 so that it can be visible from the outside. The operating portion 7 includes various operating buttons and the like, so as to deliver the corresponding operating signal to the DSP 32 when a user's operation is received. The interface portion 8 receives information such as the video information and the audio information from the television receiver 200 and delivers the same to the system controller 41.

Figure 2:
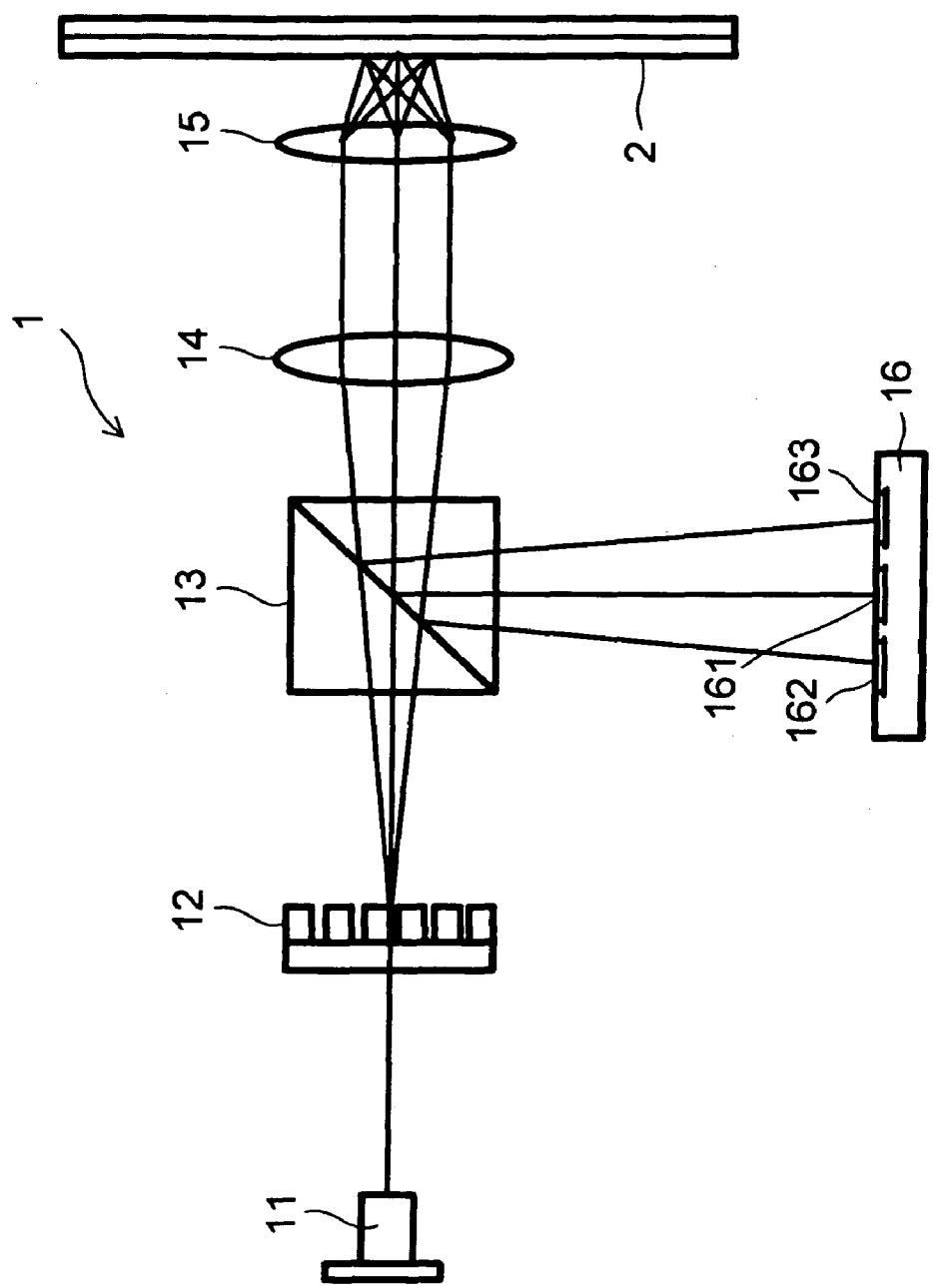
FIG. 2 is a structural diagram showing an example of a structure of an optical pickup shown in FIG. 1.

FIG. 2 is a structural diagram showing an example of a structure of an optical pickup 1 shown in FIG. 1. In addition to the LD 11 described above with reference to FIG. 1, the optical pickup 1 also includes a diffracting portion 12, a beam splitter 13, a collimator lens 14, an objective lens 15, the split optical sensor 16, the tracking error signal generating circuit 17 (not shown in FIG. 2 but see FIG. 5), and the focus error signal generating circuit 18 (not shown in FIG. 2 but see FIG. 5). The diffracting portion (grating) 12 diffracts the laser beam emitted from the LD 11 and delivers the diffraction light to the beam splitter 13.

The beam splitter 13 permits the diffraction light from the diffracting portion 12 to pass through and reflects the reflection light from the optical disc 2 so as to lead the same to the split optical sensor 16. The collimator lens 14 generates parallel rays from the laser beam from the LD 11 via the diffracting portion 12 and the beam splitter 13. The objective lens 15 condenses (focuses) the laser beam onto a signal surface of the optical disc 2.

The split optical sensor 16 receives the reflection light from the optical disc 2 via the objective lens 15, the collimator lens 14 and the beam splitter 13, so as to deliver an electric signal corresponding to quantity of the received light. The tracking error signal generating circuit 17 (not shown, corresponding to the second signal generating portion) generates the tracking error signal TE indicating quantity of focal position shift of the projection light from the LD 11 with respect to a track position on the optical disc 2 based on the electric signal from the split optical sensor 16. The focus error signal generating circuit 18 (not shown, corresponding to the first signal generating portion) generates the focus error signal FE indicating quantity of focal position shift of the projection light from the LD 11 with respect to a recording surface position on the optical disc 2 based on the electric signal from the split optical sensor 16.

Figure 3:
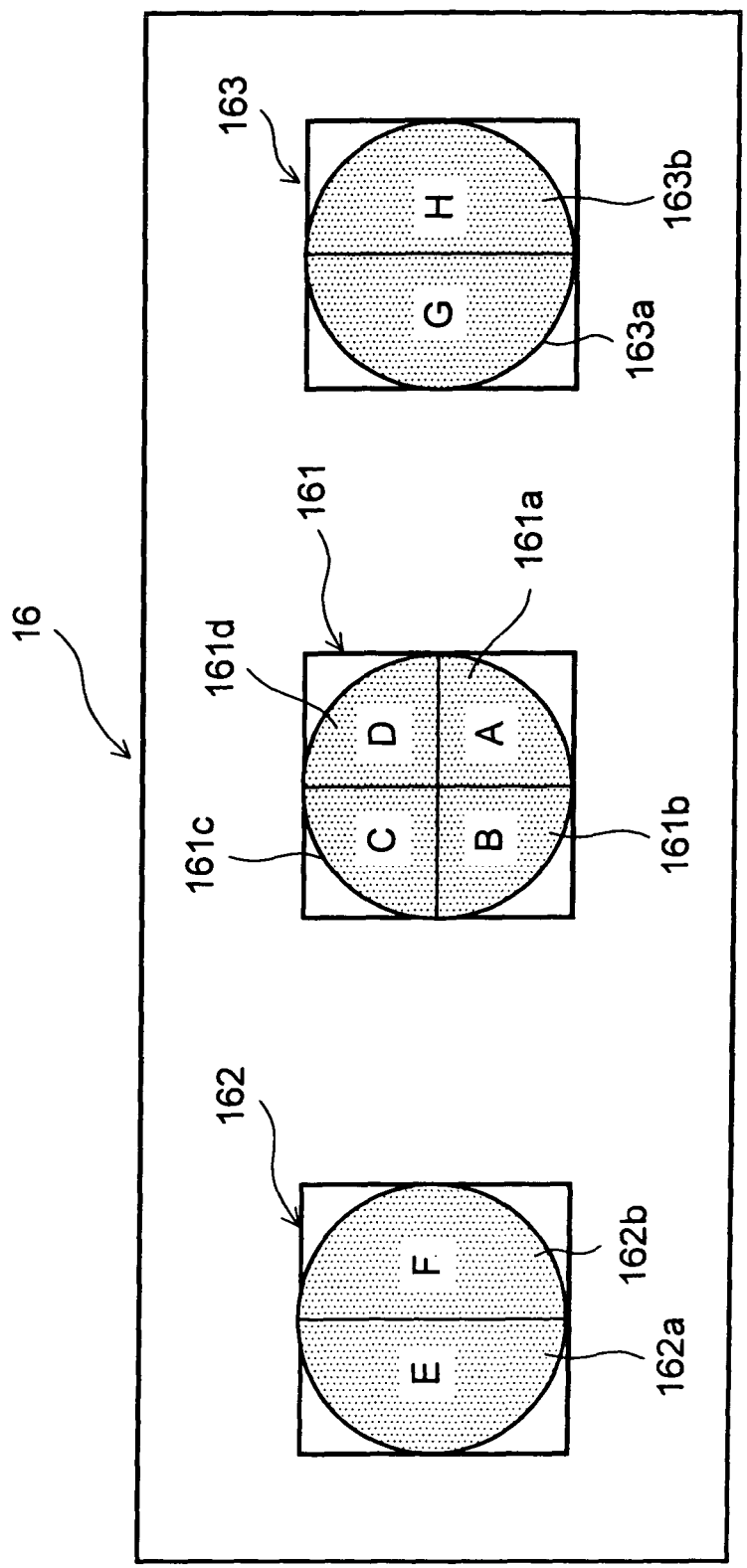
FIG. 3 is a plan view showing an example of a split optical sensor shown in FIG. 2.

FIG. 3 is a plan view showing an example of a split optical sensor 16 shown in FIG. 2. The split optical sensor 16 includes a main optical sensor 161 and sub optical sensors 162 and 163. The main optical sensor 161 is made up of optical sensors 161a, 161b, 161c and 161d obtained by dividing equally vertically and horizontally into four parts, and it receives the 0-th diffraction light (a main beam). The sub optical sensor 162 and the sub optical sensor 163 are respectively made up of optical sensors 162a and 162b, and optical sensors 163a and 163b, each of which are obtained by dividing into two parts in the vertical direction, and they receive the first diffraction light (sub beams).

Figure 5A:
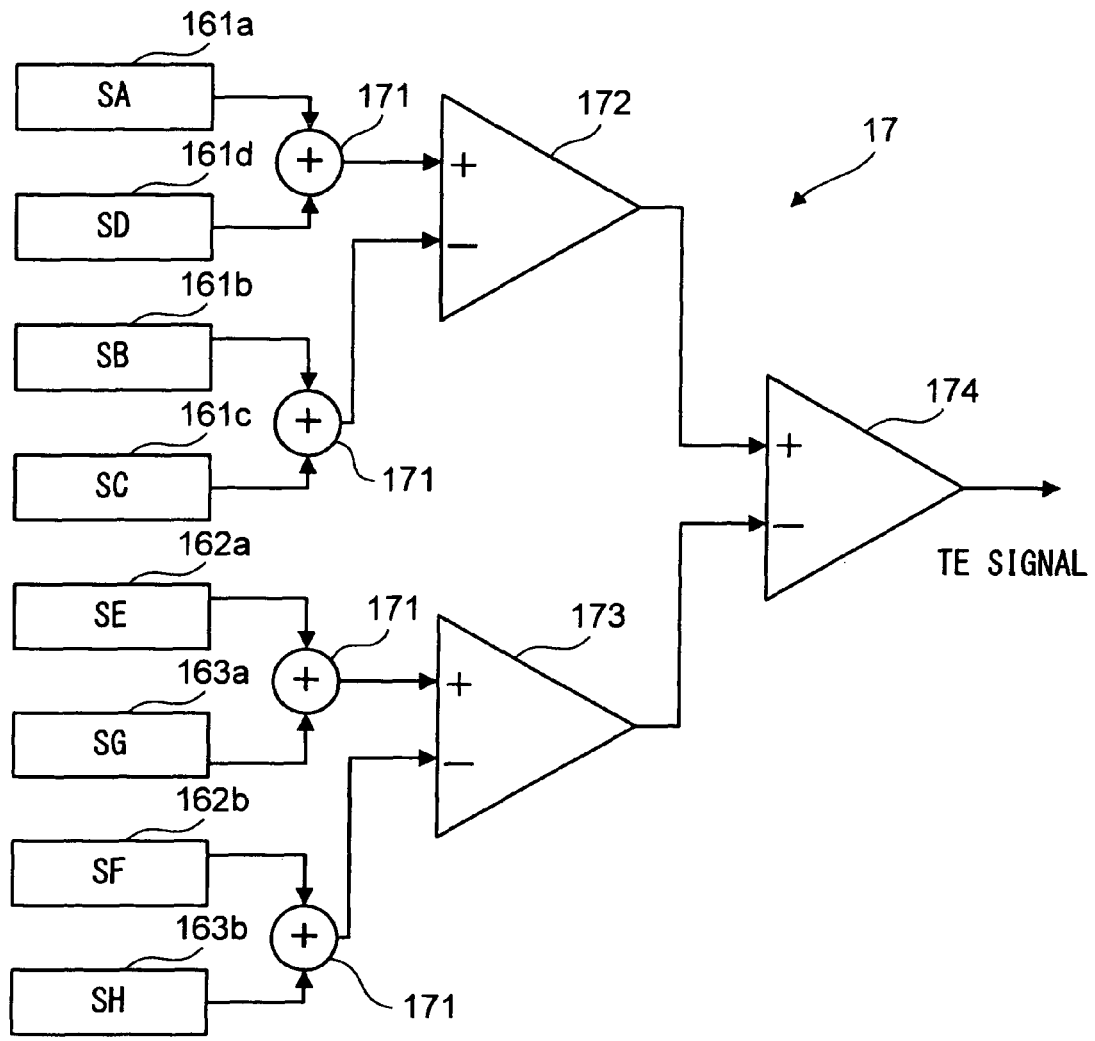
FIG. 5A is a structural diagram showing an example of a tracking error signal generating circuit disposed at an appropriate place in the optical pickup shown in FIG. 1.
Figure 5B:
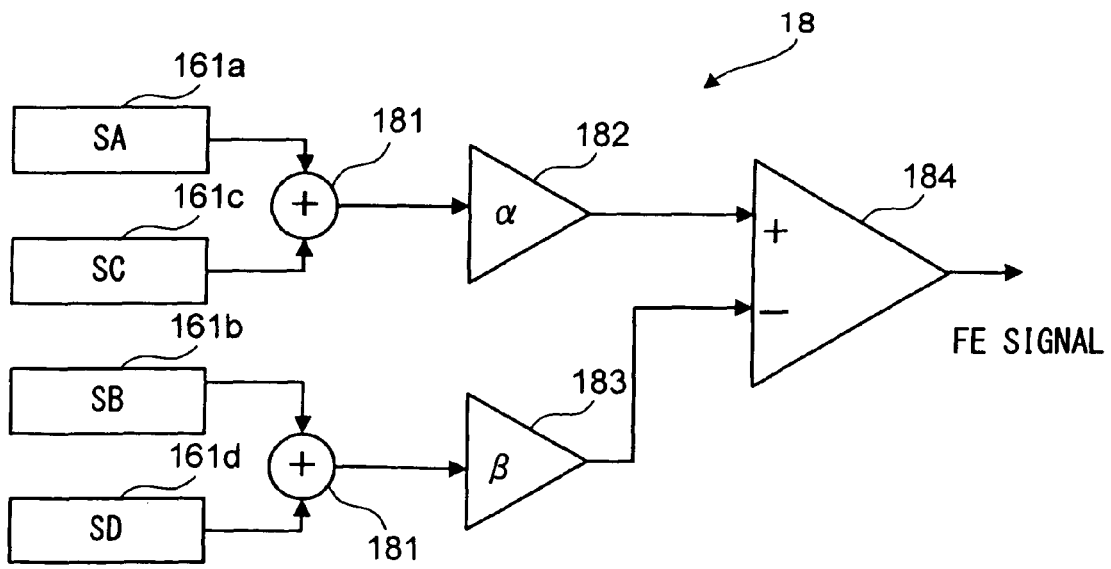
FIG. 5B is a structural diagram showing an example of a focus error signal generating circuit.

The optical sensors 161a, 161b, 161c and 161d of the main optical sensor 161 generate electric signals SA, SB, SC and SD corresponding to individual quantities of the received light, and they deliver the signals to the tracking error signal generating circuit 17 and the focus error signal generating circuit 18 (see FIG. 5B). The optical sensors 162a and 162b of the sub optical sensor 162 generate electric signals SE and SF corresponding to individual quantities of the received light, and they deliver the signals to the tracking error signal generating circuit 17 (see FIG. 5A). The optical sensors 163a and 163b of the sub optical sensor 163 generate electric signals SG and SH corresponding to individual quantities of the received light, and they deliver the signals to the tracking error signal generating circuit 17 (see FIG. 5A).

Figure 4:
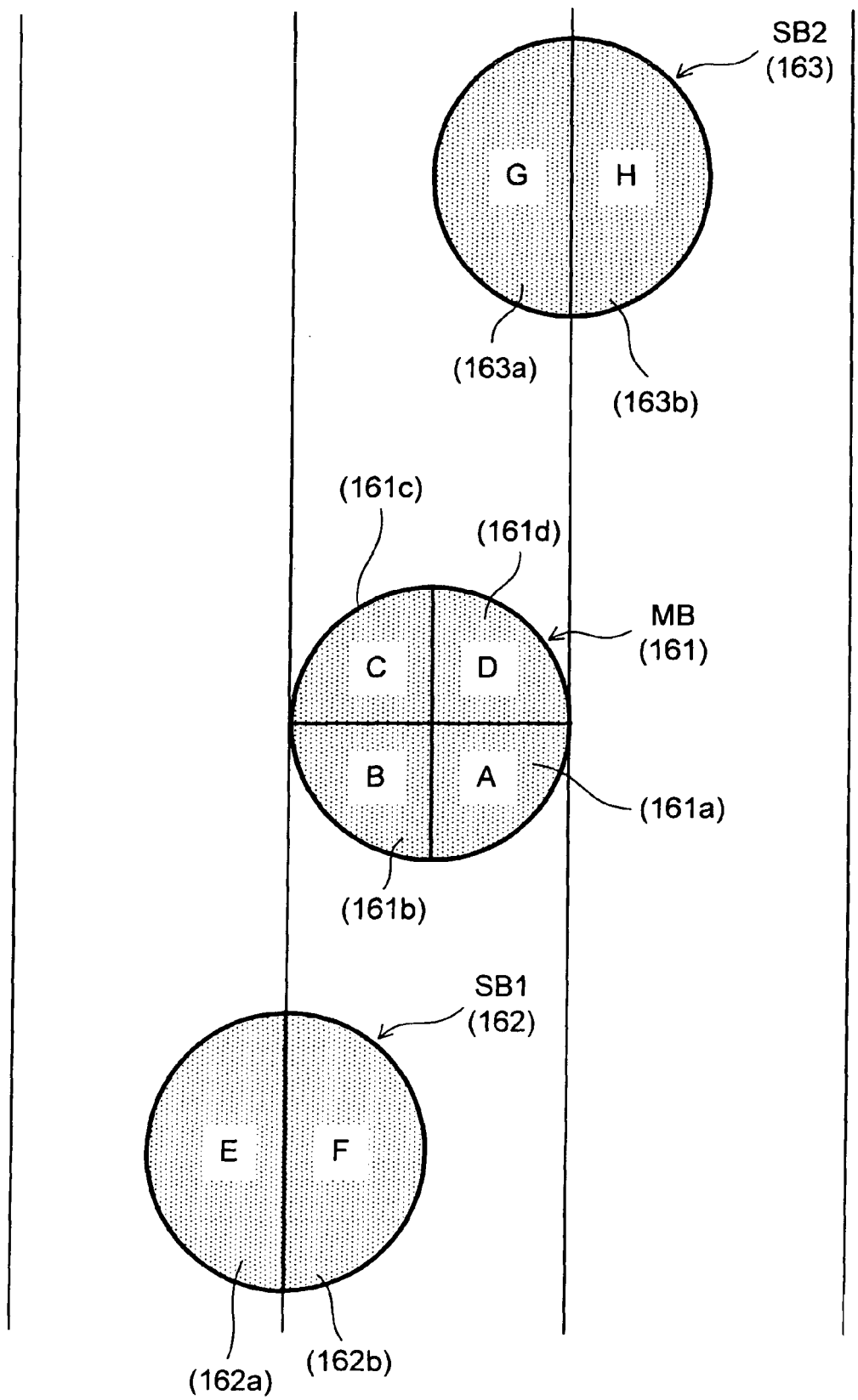
FIG. 4 is a conceptual diagram showing 0-th diffraction light and first diffraction light to be projected onto the optical disc.

FIG. 4 is a conceptual diagram showing the 0-th diffraction light and the first diffraction light to be projected onto the optical disc 2. The laser beam emitted from the LD 11 shown in FIG. 2 is divided into three beams by the diffracting portion 12 shown in FIG. 2, so that one main beam MB and two sub beams SB1 and SB2 are projected to the tracks on the optical disc 2 substantially in parallel will a small angles as shown in FIG. 4. In other words, the sub beams SB1 and SB2 are projected with a shift of substantially a half of a track pitch from the main beam.

FIG. 4 is a diagram showing the state where the main beam MB and the sub beams SB1 and SB2 are condensed on the optical disc 2 by the objective lens 15 shown in FIG. 2. The main beam MB is projected onto a groove, while the sub beams SB1 and SB2 are projected onto lands.

In addition, the main beam MB is received by the optical sensors 161a, 161b, 161c and 161d of the main optical sensor 161 shown in FIG. 3 so that the electric signals SA, SB, SC and SD are generated corresponding to individual quantities of received light. The sub beam SB1 is received by the optical sensors 162a and 162b of the sub optical sensor 162 shown in FIG. 3, so that the electric signals SE and SF are generated corresponding to individual quantities of received light. The sub beam SB2 is received by the optical sensors 163a and 163b of the sub optical sensor 163 shown in FIG. 3, so that the electric signals SG and SH are generated corresponding to individual quantities of received light.

FIG. 5A is a structural diagram showing an example of the tracking error signal generating circuit 17. The tracking error signal generating circuit 17 (corresponding to the second signal generating portion) generates the tracking error signal TE based on the electric signal from the split optical sensor 16. As shown in FIG. 5A, the tracking error signal generating circuit 17 is supplied with eight electric signals SA, SB, SC, SD, SE, SF, SG and SH from the split optical sensor 16. In addition, the tracking error signal generating circuit 17 includes four adding circuits 171, a main differential amplifier 172, a sub differential amplifier 173 and a composite differential amplifier 174.

Each of the four adding circuits 171 adds two electric signals SA and SD, or the electric signals SB and SC, or the electric signals SE and SG, or the electric signals SF and SH. The signal after the adding operation is delivered to the main differential amplifier 172 or the sub differential amplifier 173.

The main differential amplifier 172 generates a main error signal MTE ((SA+SD)−(SB+SC)) from the four electric signals SA, SB, SC and SD corresponding to the main beam MB (see FIG. 4) in the reflection light from the optical disc 2, and it delivers the generated signal to the composite differential amplifier 174.

The sub differential amplifier 173 generates a sub error signal STE ((SE+SG)−(SF+SH)) from the four electric signals SE, SF, SG and SH corresponding to the sub beams SB1 and SB2 (see FIG. 4) in the reflection light from the optical disc 2, and it delivers the generated signal to the composite differential amplifier 174.

The composite differential amplifier 174 determines a difference value obtained by subtracting the sub error signal STE delivered by the sub differential amplifier 173 from the main error signal MTE delivered by the main differential amplifier 172, so as to generate the tracking error signal TE. In other words, the tracking error signal TE is obtained by the equation (1) below from the electric signals SA, SB, SC, SD, SE, SF, SG and SH delivered by the split optical sensor 16.

$$TE=((SA+SD)-(SB+SC))-((SE+SG)-(SF+SH)) \quad (1)$$

FIG. 5B is a structural diagram showing an example of the focus error signal generating circuit 18. The focus error signal generating circuit 18 (corresponding to the first signal generating portion) generates the focus error signal FE based on the four electric signals SA, SB, SC and SD corresponding to the main beam MB from the split optical sensor 16 (see FIG. 4). As shown in FIG. 5A, the tracking error signal generating circuit 17 is supplied with the four electric signals SA, SB, SC and SD from the split optical sensor 16. In addition, the focus error signal generating circuit 18 includes two adding circuits 181, a first amplifier 182, a second amplifier 183, and a differential amplifier 184.

Each of the two adding circuit 181 adds two electric signals SA and SC or electric signals SB and SD, and delivers the signal after the adding operation to the first amplifier 182 or the second amplifier 183.

The first amplifier 182 is adapted to be capable of setting its gain a (corresponding to the focus balance value), and it amplifies the signal (SA+SC) from the adding circuit 181 by the gain of α times, so as to deliver the amplified signal to the differential amplifier 184. The second amplifier 183 is adapted to be capable of setting its gain β, and it amplifies the signal (SB+SD) from the adding circuit 181 by the gain of β times, so as to deliver the amplified signal to the differential amplifier 184. Note that the gain β is defined by the equation (2) below.

$$\beta=2-\alpha \quad (2)$$

The differential amplifier 184 determines a difference value obtained by subtracting the signal delivered by the second amplifier 183 from the signal delivered by the first amplifier 182, so as to generate the focus error signal FE. In other words, the focus error signal FE is obtained by the equation (2) below from the electric signals SA, SB, SC and SD delivered by the split optical sensor 16.

$$FE=\alpha \times (SA+SC)-\beta \times (SB+SD) \quad (3)$$

Here, since the gain β is defined by the equation (2), the focus error signal FE can be determined by the equation (4) below.

$$FE=\alpha \times (SA+SC)-(2-\alpha) \times (SB+SD) \quad (4)$$

Figure 6:
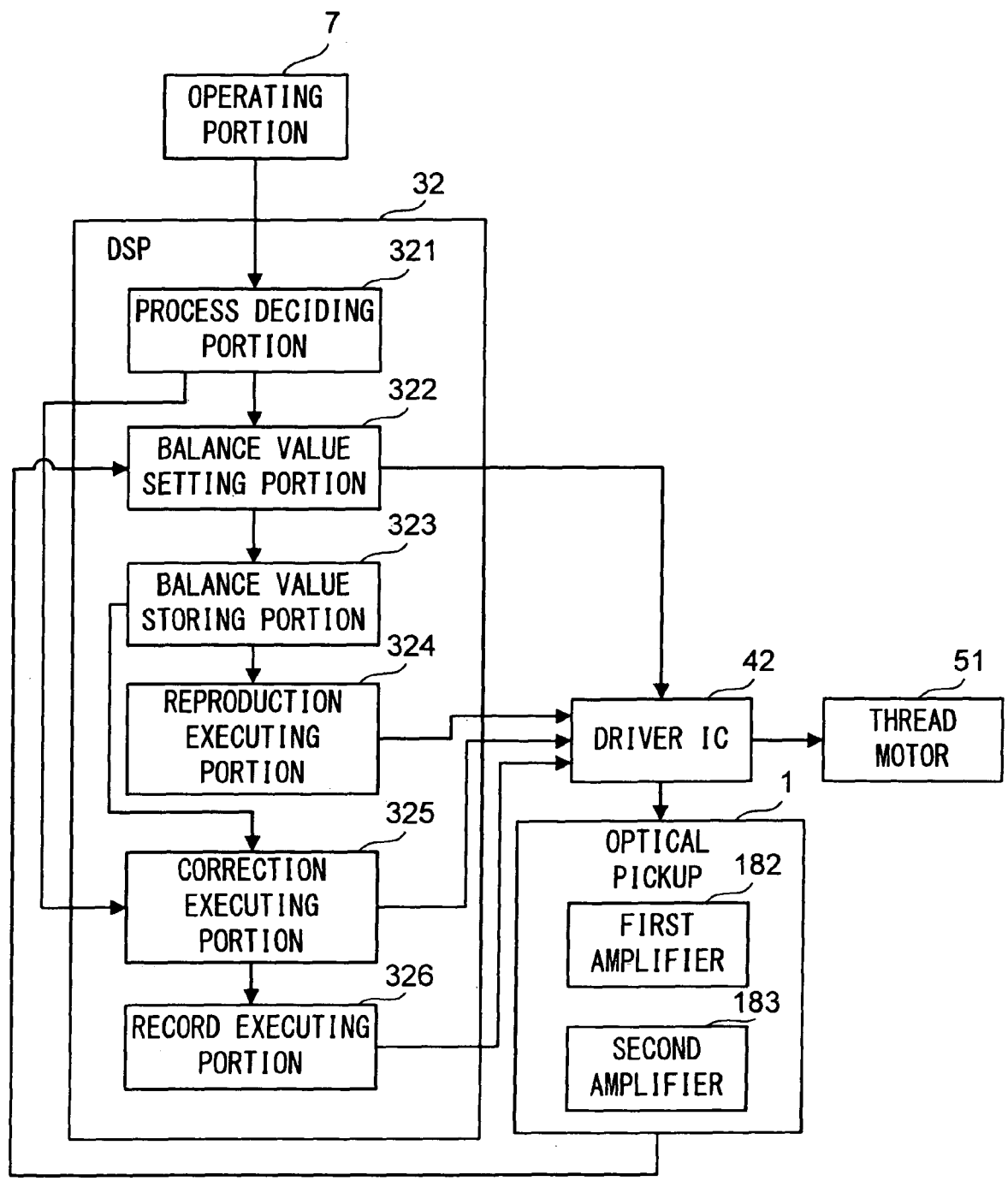
FIG. 6 is a functional structural diagram showing an example of a structure of a main portion (mainly a DSP) in the DVD recorder according to the present invention.

Furthermore, a reproduction executing portion 324 and a record executing portion 326 shown in FIG. 6 moves the optical pickup 1 in the vertical direction of the optical disc 2 via the thread motor 51 shown in FIG. 1 so that the focus error signal FE becomes "0". Therefore, the equation (5) below holds in the reproducing process and in the recording process.

$$\alpha \times (SA+SC)-(2-\alpha) \times (SB+SD)=0 \quad (5)$$

In other words, the gain α (corresponding to the focus balance value) is defined by the equation (6) below from the equation (5).

$$\alpha=2\times(SB+SD)/(SA+SB+SC+SD) \quad (6)$$

FIG. 6 is a functional structural diagram showing an example of a structure of a main portion (mainly a DSP 32) in the DVD recorder 100 according to the present invention. The DSP 32 includes a micro processing unit (MPU), a random access memory (RAM), and a read only memory (ROM) (not shown). The DSP 32 has functional portions including a process deciding portion 321, a balance value setting portion 322, a balance value storing portion 323, the reproduction executing portion 324, a correction executing portion 325, and the record executing portion 326.

Here, the MPU reads out a program stored in the ROM or the like in advance and executes the program so as to work as functional portions including the process deciding portion 321, the balance value setting portion 322, the reproduction executing portion 324, the correction executing portion 325, the record executing portion 326 and the like. It also makes the RAM works as functional portions including the balance value storing portion 323 and the like.

In addition, data that can be stored in a removable recording medium among the various types of data stored in the RAM or the ROM (not shown) may be adapted to be capable of being read by a driver of a hard disk drive, an optical disc drive, a flexible disc drive, a silicon disc drive, a cassette media reader or the like, for instance. In this case, the recording medium is a hard disk, an optical disc, a flexible disc, a compact disk (CD), a DVD, a semiconductor memory or the like.

The balance value storing portion 323 (corresponding to the balance value storing portion) stores in advance the focus balance value (gain)α indicating a balance of an S-shaped curve obtained in the focus searching process (when the reproduction executing portion 324 or the record executing portion 326 executes the focusing process). The gain α stored in the balance value storing portion 323 is recorded by the balance value setting portion 322 and is read by the correction executing portion 325.

Figure 7A:
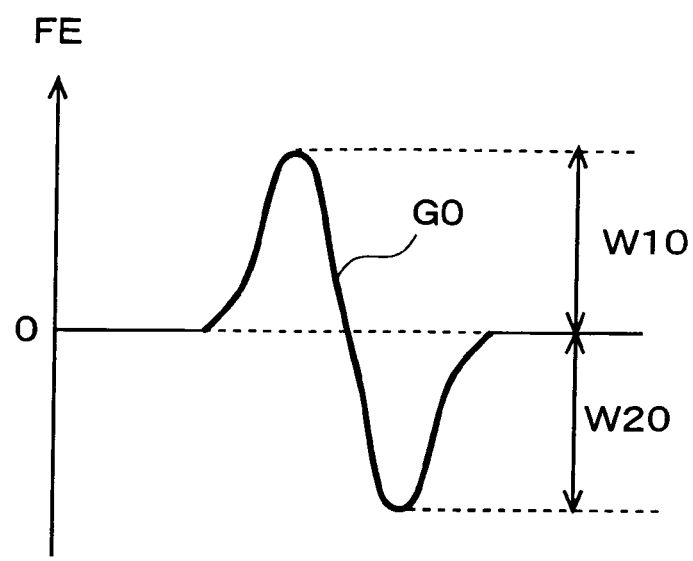
FIG. 7A is a graph showing an S-shaped curve of a focus error signal FE in a well balanced state.
Figure 7B:
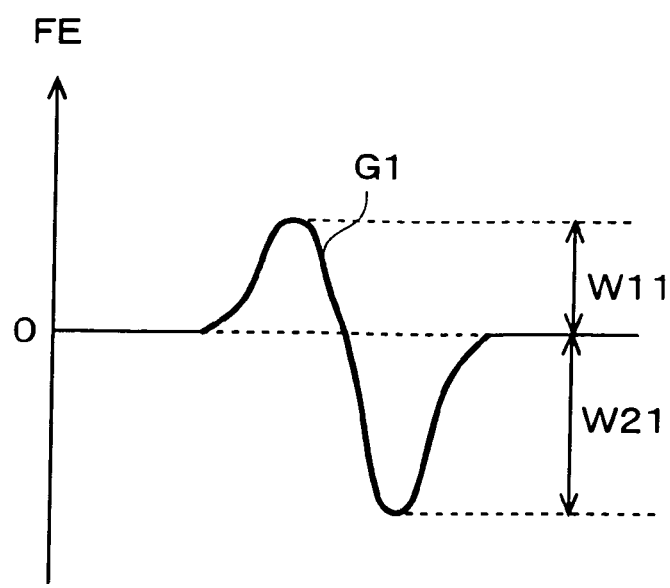
FIG. 7B is a graph showing an S-shaped curve of the focus error signal FE in an unbalanced state.

Each of FIGS. 7A and 7B is a graph showing an example of the S-shaped curve of the focus error signal FE. The horizontal axis of the graph represents time, and the vertical axis represents the focus error signal FE delivered by the focus error signal generating circuit 18 shown in FIG. 5B. FIG. 7A is a graph G0 showing the S-shaped curve in a well balanced state of the focus error signal FE, while FIG. 7B is a graph G1 showing the S-shaped curve in an unbalanced state of the focus error signal FE.

As shown in FIG. 7A, if the balance of the focus error signal FE is good, the amplitude W10 of the focus error signal FE in the positive direction substantially matches the amplitude W20 in the negative direction. As shown in FIG. 7B, if the balance of the focus error signal FE is lost, the amplitude W11 of the focus error signal FE in the positive direction is different from (e.g., is smaller than) the amplitude W21 in the negative direction. In the focusing process performed by the reproduction executing portion 324 and the record executing portion 326, the optical pickup 1 is moved in the vertical direction of the optical disc 2 driven by the thread motor 51 shown in FIG. 1 so that the S-shaped curve shown in FIG. 7B is corrected to be the S-shaped curve shown in FIG. 7A.

With reference to FIG. 6 again, a functional structure of the DSP 32 will be described. The process deciding portion 321 receives an operational input from a user via the operating portion 7 and decides whether the reproducing process should be executed or the recording process should be executed based on the received operational input. Furthermore, the process deciding portion 321 decides whether or not the recording should be performed in the 0-th layer of the optical disc 2 (that is the DVD capable of recording in two layers including the 0-th layer and the first layer) when the recording process is performed.

When the process deciding portion 321 decides that the reproducing process should be performed, the balance value setting portion 322 (corresponding to the balance value setting portion) determines an appropriate value of the focus balance value (gain) $\alpha$. The determined focus balance value $\alpha$ is recorded in the balance value storing portion 323, and the gain $\alpha$ is set in the first amplifier 182 of the focus error signal generating circuit 18 shown in FIG. 5B. Note that in this case the gain $\beta(=2-\alpha)$ determined by the above equation (2) is set in the second amplifier 183 of the focus error signal generating circuit 18 shown in FIG. 5B.

After performing the focusing process, the reproduction executing portion 324 (corresponding to a part of the position control portion) performs the tracking servo control and reads video information and the like stored in the optical disc 2 via the optical pickup 1, so that the read information is delivered to the speaker and the monitor provided to the television receiver 200 (performs the reproducing process of the optical disc 2).

More specifically, the reproduction executing portion 324 controls a position of the optical pickup 1 in the direction closing to or separating from the optical disc 2 via the thread motor 51 based on the focus error signal FE delivered by the focus error signal generating circuit 18 (performs the focusing process). Then, the reproduction executing portion 324 performs the tracking servo control (control for following correctly the track formed on the optical disc 2) based on the tracking error signal TE delivered by the tracking error signal generating circuit 17 and reads the video information and the like stored in the optical disc 2 via the optical pickup 1, so as to deliver the read information to the speaker and the monitor provided to the television receiver 200.

When the process deciding portion 321 decides that the recording process should be performed and that the information should be recorded in the 0-th layer of the optical disc 2, The correction executing portion 325 (corresponding to the correction executing portion) reads the focus balance value a stored in the balance value storing portion 323 and corrects the same so as to set the same in the first amplifier 182 of the focus error signal generating circuit 18.

More specifically, the correction executing portion 325 corrects the focus balance value $\alpha$ here by multiplying a preset predetermined correction value (e.g., a value within the range of 1.12 to 1.17, e.g., 1.15) to the focus balance value $\alpha$ stored in the balance value storing portion 323, and sets the corrected gain (focus balance value) $\alpha$ in the first amplifier 182. Note that the correction executing portion 325 sets in the second amplifier 183 the gain $\beta(=2-\alpha$, here, $\alpha$ is the corrected gain) determined by the above equation (2).

Figure 8:
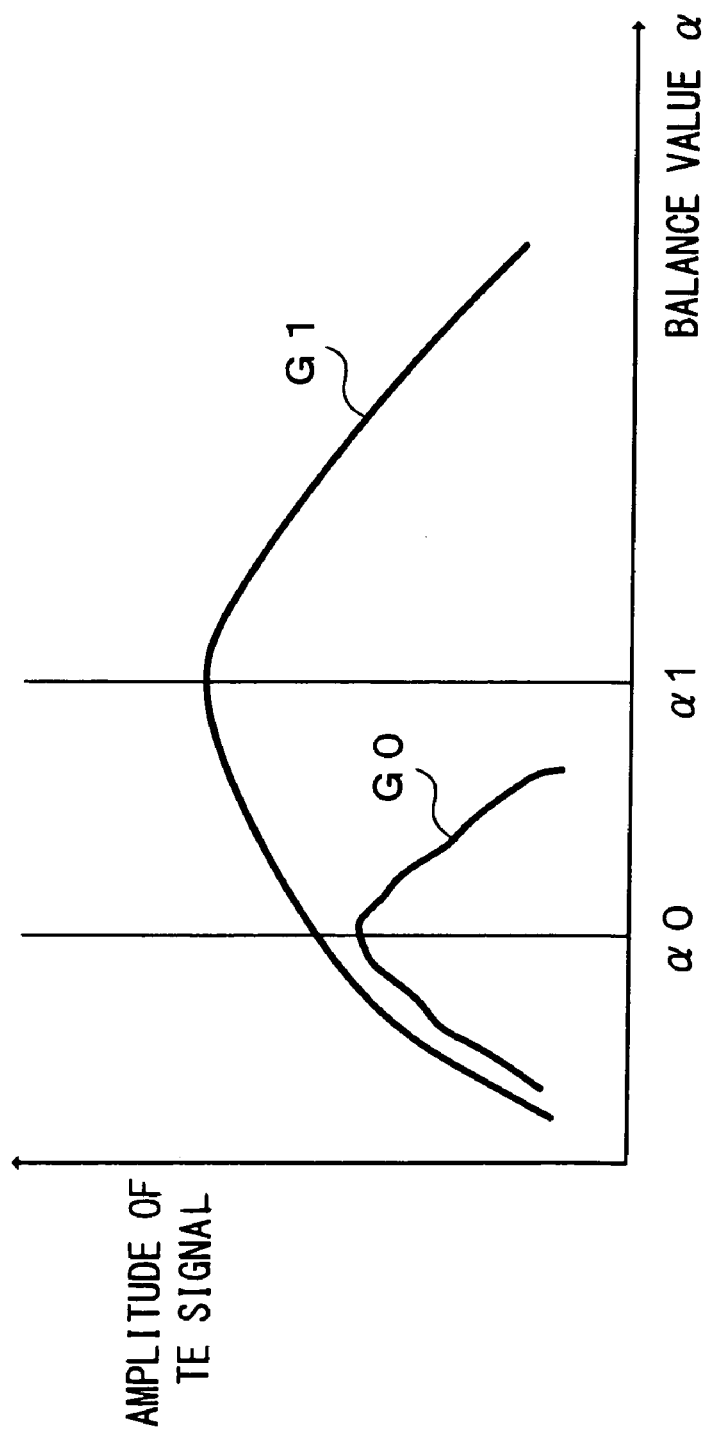
FIG. 8 is a graph showing an example of a relationship between amplitude of a tracking error signal TE delivered from the tracking error signal generating circuit and a gain α before or after correction performed by a correction executing portion.

FIG. 8 is a graph showing an example of a relationship between amplitude of the tracking error signal TE delivered from the tracking error signal generating circuit 17 and the gain (focus balance value) $\alpha$ before or after the correction performed by the correction executing portion 325. The horizontal axis of the graph represents the gain (focus balance value) $\alpha$, while the vertical axis represents an amplitude value of the tracking error signal TE.

The graph G0 shows a relationship between the gain $\alpha$ and the amplitude of the tracking error signal TE in the reproducing process, while the graph G1 shows a relationship between the gain $\alpha$ and the amplitude of the tracking error signal TE in the recording process in which information is recorded in the 0-th layer of the optical disc 2. As shown in the graph G0, the amplitude value of the tracking error signal TE becomes maximum when the gain $\alpha$ is $\alpha 0$ in the reproducing process. In addition, the amplitude value of the tracking error signal TE becomes maximum when the gain $\alpha$ is $\alpha 1$ ($=1.15\times\alpha 0$) in the recording process in which information is recorded in the 0-th layer of the optical disc 2. In other words, the correction executing portion 325 corrects the gain $\alpha$ based on the $\alpha 0$ so that the amplitude value of the tracking error signal TE becomes maximum.

With reference to FIG. 6 again, the functional structure of the DSP 32 will be described. After performing the focusing process, the record executing portion 326 (corresponding to a part of the position control portion) performs the tracking servo control and records the video information and the like received from the television receiver 200 on the optical disc 2 via the optical pickup 1 (performs the recording process on the optical disc 2).

More specifically, the record executing portion 326 first controls a position of the optical pickup 1 in the direction closing to or separating from the optical disc 2 via the thread motor 51 based on the focus error signal FE delivered by the focus error signal generating circuit 18 (performs the focusing process). Then, the record executing portion 326 performs the tracking servo control (control for following correctly the track formed on the optical disc 2) based on the tracking error signal TE delivered by the tracking error signal generating circuit 17 and records the video information and the like received from the television receiver 200 on the optical disc 2 via the optical pickup 1.

Figure 9:
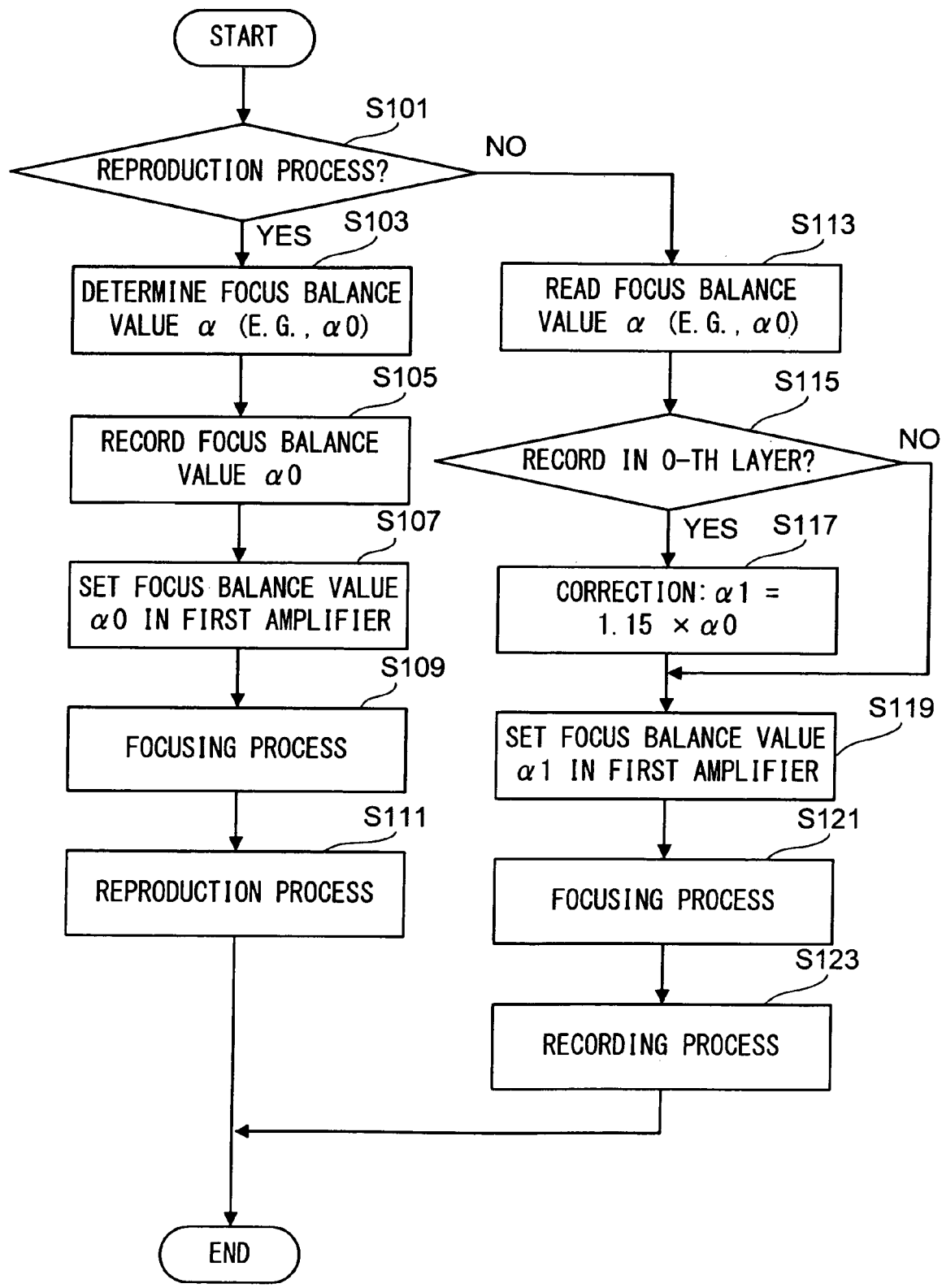
FIG. 9 is a flowchart showing an example of an operation of the DVD recorder according to the present invention.

FIG. 9 is a flowchart showing an example of an operation of the DVD recorder 100 according to the present invention. First, the process deciding portion 321 decides whether or not the reproducing process should be performed (S101). If it is decided that the reproducing process should not be performed (the recording process should be performed) (NO in S101), the process goes to the step S113. If the reproducing process should be performed (YES in S101), the balance value setting portion 322 determines an appropriate value of the focus balance value $\alpha$ (e.g., $\alpha 0$) (S103). Then, the balance value setting portion 322 stores the focus balance value $\alpha$ (e.g., $\alpha 0$) determined in the step S103 in the balance value storing portion 323 (S105).

Next, the balance value setting portion 322 sets the focus balance value α (e.g., α0) determined in the step S103 in the first amplifier 182 (S107). Next, the reproduction executing portion 324 performs the focusing process (S109). Then, the reproduction executing portion 324 performs the reproducing process of the optical disc 2 (S111), and the process is finished.

In case of "NO" in the step S101 (if it is decided that the recording process should be performed), the correction executing portion 325 reads the focus balance value α (e.g., α0) stored in the balance value storing portion 323 (S113). Then, the process deciding portion 321 decides whether or not information should be recorded in the 0-th layer of the optical disc 2 (S115). If it is decided that information should be recorded in the first layer of the optical disc 2 (NO in S115), the process goes to the step S119. If it is decided that information should be recorded in the 0-th layer of the optical disc 2 (YES in S115), the correction executing portion 325 corrects the focus balance value α (e.g., α0) by multiplying a preset predetermined correction value (e.g., 1.15) to the focus balance value α (e.g., α0) read out in the step S113 (S117).

Next, the correction executing portion 325 sets the focus balance value α (e.g., α1) corrected in the step S117 or the focus balance value α (e.g., α0) read out in the step S113 in the first amplifier 182 of the focus error signal generating circuit 18 in accordance with the recording layer of the optical disc 2 (S119). Next, the record executing portion 326 performs the focusing process (S121). Then, the record executing portion 326 performs the recording process on the optical disc 2 (S123), and the process is finished.

In this way, the focus balance value α (e.g., α0) indicating the balance of the S-shaped curve obtained in the focus search process (see FIG. 7) is stored in the balance value storing portion 323 in advance, focus error signal generating circuit 18 generates the focus error signal FE indicating the quantity of focal position shift of the projection light from the LD 11 with respect to the position of the recording surface of the optical disc 2 based on the plurality of (e.g., four) electric signals SA, SB, SC and SD via the computing equation (the above equation (4)) defined by the focus balance value α stored in the balance value storing portion 323. Then, based on the focus error signal FE, the position of the optical pickup 1 in the direction closing to or separated from the optical disc 2 is controlled. After the position of the optical pickup 1 is controlled, the tracking error signal generating circuit 17 generates the tracking error signal TE indicating the quantity of focal position shift of the projection light from the LD 11 with respect to the track position on the optical disc 2 based on the plurality of (e.g., eight) electric signals SA, SB, SC, SD, SE, SF, SG and SH. Furthermore, when information is reproduced from the optical disc 2, the appropriate value of the focus balance value α (e.g., α0) is determined. The determined focus balance value α0 is recorded in the balance value storing portion 323 and set in the focus error signal generating circuit 18. When information is recorded on the optical disc 2, the focus balance value α0 stored in the balance value storing portion 323 is read and corrected so that it is set in the focus error signal generating circuit 18. Therefore, accuracy of the tracking servo can be stabilized.

More specifically, when information is reproduced from the optical disc 2, an appropriate value of the focus balance value α (e.g., α0) is determined. The delivered focus balance value α0 is recorded in the balance value storing portion 323 and is set in the focus error signal generating circuit 18. When information is recorded on the optical disc 2, the focus balance value α1 stored in the balance value storing portion 323 is read and is corrected to be the focus balance value α1 (see FIG. 8), which is set in the focus error signal generating circuit 18. Therefore, it is possible to prevent the amplitude of the tracking error signal TE from decreasing in the recording process by correcting the focus balance value α to be an appropriate value (e.g., α1). Thus, accuracy of the tracking servo can be stabilized.

In other words, when information is recorded on the optical disc 2, the focus balance value α is corrected to be the value (e.g., α1) such that the amplitude of the tracking error signal TE becomes maximum, so that the decrease of the amplitude of the tracking error signal TE in the recording process can be prevented.

In addition, the preset predetermined correction value (e.g., 1.15) is multiplied to the focus balance value α0 stored in the balance value storing portion 323, so that the focus balance value α0 is corrected to be the focus balance value α1, which is set in the focus error signal generating circuit 18. Thus, accuracy of the tracking servo can be stabilized by a simple structure.

Furthermore, since the correction value is within the range of 1.12 to 1.17 (e.g., 1.15), accuracy of the tracking servo can be stabilized by a simple structure.

In other words, when information is recorded on the optical disc 2, the amplitude of the tracking error signal TE will be decreased if the focus balance value α0 set in the reproducing process is used for the recording process. Therefore, the correction value set to a value within the range of 1.12 to 1.17 is multiplied to the focus balance value α0 so that the focus balance value is corrected (to be the focus balance value α1). Thus, it can be corrected to be a value such that the amplitude of the tracking error signal TE becomes maximum. Thus, accuracy of the tracking servo can be stabilized by a simple structure (see FIG. 8).

In addition, since the optical disc 2 is a DVD capable of recording information in two layers including the 0-th layer and the first layer, amplitude of the tracking error signal TE may be decreased due to an influence of the interference light from the neighboring layer in the recording process or other factor (see FIG. 8). Therefore, if the focus balance value α is corrected, the effect of stabilizing the accuracy of the tracking servo becomes more apparent.

In addition, since the focus balance value α0 stored in the balance value storing portion 323 is read and corrected only in the case where information is recorded in the 0-th layer of the optical disc 2, accuracy of the tracking servo can be further stabilized.

In other words, if information is recorded in the 0-th layer of the DVD that is capable of recording information in two layers including the 0-th layer and the first layer, amplitude of the tracking error signal TE is decreased due to an influence of the interference light from the neighboring layer or other factor (see FIG. 8). Therefore, only in this case, the focus balance value α0 is corrected to be the focus balance value α1, so that accuracy of the tracking servo can be further stabilized.

Note that the present invention can also be applied to the following structures.

(A) Although this embodiment describes the case where the optical disc recording and reproducing apparatus is the DVD recorder 100, the optical disc recording and reproducing apparatus may be other apparatus for recording information on an optical disc and for reading and reproducing information stored in the optical disc. For instance, the optical disc recording and reproducing apparatus can be a personal computer having a structure capable of recording information on a DVD and reproducing information from a DVD.

(B) Although this embodiment describes the case where the DSP 32 works as the functional portions including the process deciding portion 321, the balance value setting portion 322, the reproduction executing portion 324, the correction executing portion 325, the record executing portion 326 and the like, it is possible to constitute at least one of the functional portions including the process deciding portion 321, the balance value setting portion 322, the reproduction executing portion 324, the correction executing portion 325 and the record executing portion 326 by hardware such as a circuit.

(C) Although this embodiment describes the case where the optical disc 2 is a DL type of DVD, the optical disc 2 may be other type of DVD (e.g., a DVD-RAM or the like).

What is claimed is:

1. An optical disc recording and reproducing apparatus equipped with an optical pickup for projecting a laser beam from a laser light source to an optical disc and converting reflection light from the optical disc into a plurality of electric signals via a split optical sensor, through which the apparatus records information on the optical disc and reads information stored in the optical disc so as to reproduce the information, the apparatus comprising:

a balance value storing portion for storing in advance a focus balance value indicating a balance an S-shaped curve obtained in a focus search operation;

a first signal generating portion for generating a focus error signal indicating quantity of focal position shift of projection light from the laser light source with respect to a position of a recording surface of the optical disc via a computing equation defined by the focus balance value stored in the balance value storing portion based on the plurality of electric signals;

a position control portion for control a position of the optical pickup in the direction closing to or separating from the optical disc based on the focus error signal;

a second signal generating portion for generating a tracking error signal indicating quantity of focal position shift of the projection light from the laser light source with respect to the track position on the optical disc based on the plurality of electric signals after the position control portion has controlled the position of the optical pickup;

a balance value setting portion for determining an appropriate value of the focus balance value when information is reproduced from the optical disc so as to record the determined appropriate value of the focus balance value in the balance value storing portion and to set the same in the first signal generating portion; and a correction executing portion for reading the appropriate value of the focus balance value stored in the balance value storing portion when information is recorded on the optical disc so as to correct the read value and to set the corrected value in the first signal generating portion.

2. The optical disc recording and reproducing apparatus according to claim 1, wherein the correction executing portion corrects the focus balance value by multiplying a preset predetermined correction value by the appropriate value of the focus balance value stored in the balance value storing portion, and sets the corrected value in the first signal generating portion.

3. The optical disc recording and reproducing apparatus according to claim 2, wherein the predetermined correction value is a value within the range of 1.12 to 1.17.

4. The optical disc recording and reproducing apparatus according to claim 1, wherein the optical disc is a digital versatile disk (DVD) capable of recording information in two layers including the 0-th layer and the first layer.

5. The optical disc recording and reproducing apparatus according to claim 4, wherein the correction executing portion reads and corrects the appropriate value of the focus balance value stored in the balance value storing portion only in the case where information is recorded in the 0-th layer of the optical disc.

\* \* \* \* \*